(12) United States Patent
Quintero et al.

(10) Patent No.: US 10,969,510 B2
(45) Date of Patent: Apr. 6, 2021

(54) CHARACTERIZATION OF WELLBORE MATERIALS IN MULTIPLE CASING STRINGS

(71) Applicant: HALLIBURTON ENERGY SERVICES, INC., Houston, TX (US)

(72) Inventors: Luis F. Quintero, Katy, TX (US); Yibing Zheng, Houston, TX (US); Andrew Kirkwood, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 457 days.

(21) Appl. No.: 15/750,754

(22) PCT Filed: Sep. 14, 2016

(86) PCT No.: PCT/US2016/051763
§ 371 (c)(1),
(2) Date: Feb. 6, 2018

(87) PCT Pub. No.: WO2017/048862
PCT Pub. Date: Mar. 23, 2017

(65) Prior Publication Data
US 2020/0088901 A1    Mar. 19, 2020

Related U.S. Application Data

(60) Provisional application No. 62/218,542, filed on Sep. 14, 2015.

(51) Int. Cl.
*G01V 1/50* (2006.01)
*G01V 1/46* (2006.01)
*E21B 47/005* (2012.01)

(52) U.S. Cl.
CPC .............. *G01V 1/50* (2013.01); *E21B 47/005* (2020.05); *G01V 1/46* (2013.01); *G01V 2210/42* (2013.01);
(Continued)

(58) Field of Classification Search
CPC ........ G01V 1/50; G01V 1/46; G01V 2210/42; G01V 2210/622; G01V 2210/6224;
(Continued)

(56) References Cited

U.S. PATENT DOCUMENTS

| 4,703,427 A | 10/1987 | Catala et al. |
| 5,644,550 A | 7/1997 | Priest |

(Continued)

FOREIGN PATENT DOCUMENTS

WO    2015023384 A1    2/2015

OTHER PUBLICATIONS

A. de Sa Neto and et al, "Echo-Meter Buildup Tests: The Effects of Fluid Hydraulics and Thermodynamics", 56617-MS SPE Conference Paper—1999 (Year: 1999).*

(Continued)

*Primary Examiner* — Alexander Satanovsky
*Assistant Examiner* — Douglas Kay
(74) *Attorney, Agent, or Firm* — Locke Lord LLP

(57) ABSTRACT

Methods, systems, and computer program products for characterizing materials in a wellbore having multiple casing strings uses well completion data and instantaneous frequency, instantaneous phase, and/or amplitude attributes, including waveform amplitude or instantaneous amplitude, of an acoustic waveform to determine material densities, acoustic velocities and acoustic travel distances for the materials between the various stages of casings.

10 Claims, 12 Drawing Sheets

(52) U.S. Cl.
CPC ............ *G01V 2210/6222* (2013.01); *G01V 2210/6224* (2013.01); *G01V 2210/63* (2013.01); *G01V 2210/677* (2013.01)

(58) Field of Classification Search
CPC ......... G01V 2210/63; G01V 2210/677; G01V 1/305; G01V 2210/43; G01V 1/40; G01V 1/48; E21B 47/005; E21B 19/10; E21B 41/00
See application file for complete search history.

(56) References Cited

U.S. PATENT DOCUMENTS

| | | | |
|---|---|---|---|
| 5,907,131 A | 5/1999 | Tello | |
| 2008/0022773 A1* | 1/2008 | McKenna | G01N 29/346 73/597 |
| 2010/0061183 A1* | 3/2010 | Mandal | G01N 29/348 367/29 |
| 2011/0161065 A1* | 6/2011 | Volker | G01N 29/326 703/14 |
| 2013/0114377 A1* | 5/2013 | Frisch | G01V 1/50 367/35 |
| 2014/0177389 A1 | 6/2014 | Bolshakov et al. | |
| 2014/0238136 A1* | 8/2014 | Ten Grotenhuis | G01N 29/0654 73/592 |
| 2015/0198030 A1 | 7/2015 | Tello et al. | |
| 2015/0218930 A1* | 8/2015 | Zeroug | E21B 47/14 367/26 |
| 2015/0219780 A1* | 8/2015 | Zeroug | E21B 47/14 702/6 |
| 2016/0109604 A1* | 4/2016 | Zeroug | E21B 47/005 367/13 |
| 2018/0023383 A1* | 1/2018 | Hori | G01V 1/40 166/253.1 |

OTHER PUBLICATIONS

International search report and written opin issued in corresponding PCT application No. PCT/US2016/051763, dated Dec. 22, 2016.
Examination report issued in corresponding GB application No. GB1801462.1, dated Nov. 2, 2020.

* cited by examiner

CHARACTERIZATION OF WELLBORE MATERIALS IN MULTIPLE CASING STRINGS

TECHNICAL FIELD

The exemplary embodiments disclosed herein relate generally to methods, systems, and computer program products for evaluating and characterizing cement and other materials between casing strings using acoustic signals, and particular to a method, system, and computer program product for performing such evaluation and characterization using multiple waveform attributes from the waveform's amplitude frequency, and/or phase variations in time.

BACKGROUND

Cementing a casing or liner in a wellbore protects oil and/or gas-producing zones surrounding the casing from contamination by subterranean brine sources, as well as corrosion of the casing or liner from brine or other corrosive fluids and electrolysis. Cementing also helps prevent contamination of fresh water-containing strata by the brine or petroleum fluids that could otherwise travel in the wellbore annulus. Other benefits of cementing include bonding of the well casings to the formation and to each other to support the vertical and radial loads applied to the casings. It is therefore important in cementing to achieve a good cement-to-pipe bond.

In the early years, wells were generally very shallow and cementing was accomplished by pumping a cement slurry down the interior of the casing and back up the exterior of the casing in the wellbore annulus. However, as wells became progressively deeper, it became more difficult to cement an entire wellbore annulus. Consequently, multiple stage cementing was developed to allow cementing of the wellbore annulus in several stages using multiple casing strings. Other factors also dictated the need for multiple casing strings, such as compliance with environmental and safety regulations.

In general, the cement between the casing strings prevents the presence and movement of fluids within the annular spaces between the casing strings. In appropriate instances, the cementing process can go from the bottom of the wellbore up to the surface, while in other instances cementing may be done only in between certain depths. Of importance is the absence of cement (or cement bonding) from a certain depth up to the surface that would indicate the presence of potentially undesirable fluid flow paths to the surface or problems with subsequent retrieval of the casing strings, for example, in the case of a plug-and-abandon operation. Good cement bonding and zonal isolation is thus essential to the overall integrity of the well, particularly in plug-and-abandon operations and in deep water wells.

In most cases, sonic tools and ultrasonic tools, such as the Circumferential Acoustic Scanning Tool™ from Halliburton Energy Services, Inc., may be used to analyze the cement bonding, both to the casing and to the formation. Both types of tools and similar sonic and ultrasonic tools are referred to herein as sonic or acoustic tools. These tools operate by sending an acoustic wave from a transmitter through the media surrounding the tool (i.e., tubing, casings) and into the formation, then measuring the energy of the reflected/refracted or transmitted wave in a receiver. For simplicity, these wave propagation methods are referred to as reflected waves unless otherwise specified. In particular, wave reflection and refraction occur at interfaces that correspond to changes in the acoustic impedance of the medium. The first reflection is usually deemed to come from the proximal face of the first casing while the second reflection is deemed to come from the distal face of the first casing. If cement is bonded to the casing, then the second reflection should be a weak reflection. If the cement is unset or there is water behind the casing, the second reflection may be a strong reflection. The various reflections are then summed to form a composite waveform that may be analyzed to produce an acoustic-impedance map of the cement.

Existing cement evaluation tools, however, typically use raw data from only one system of sonic/ultrasonic sensors to infer cement bonding parameters (e.g., compressive strength). Even when the evaluation is done with an array of sensors, or with the use of fiber optics, the evaluation is typically limited to one attribute of the acoustic waveform, such as its amplitude, and is moreover limited to characterization of the first casing-cement bond, omitting evaluation of the second and third interfaces in the case of multiple casing strings.

Thus, a need exists for an improved way to evaluate and characterize cement and other material, and particularly for a way to evaluate and characterize cement bonds using multiple waveform attributes from the waveform's amplitude, frequency, and/or phase variations in time.

BRIEF DESCRIPTION OF THE DRAWINGS

For a more complete understanding of the exemplary disclosed embodiments, and for further advantages thereof, reference is now made to the following description taken in conjunction with the accompanying drawings in which.

DESCRIPTION OF EXEMPLARY EMBODIMENTS

The following discussion is presented to enable a person skilled in the art to make and use the exemplary disclosed embodiments. Various modifications will be readily apparent to those skilled in the art, and the general principles described herein may be applied to embodiments and applications other than those detailed below without departing from the spirit and scope of the disclosed embodiments as defined herein. The disclosed embodiments are not intended to be limited to the particular embodiments shown, but are to be accorded the widest scope consistent with the principles and features disclosed herein.

The embodiments disclosed herein relate to an improved method and system for evaluating and characterizing various materials in a wellbore with multiple casing strings. As alluded to above, the disclosed embodiments use all or multiple waveform attributes from an acoustic spectrum of the sonic signal to obtain a more direct and accurate assessment of cement bond quality. These embodiments are able to achieve more accurate cement bond quality assessments by evaluating the different densities at the casing-cement interface and annular equivalent densities due to the presence of water, oil, or gas in between the multiple casing strings. Such evaluations may be performed in any type of well where cementing is needed, including vertical, horizontal, deviated, or otherwise nonlinear wellbores, in any type of subterranean formation.

Figure 1:
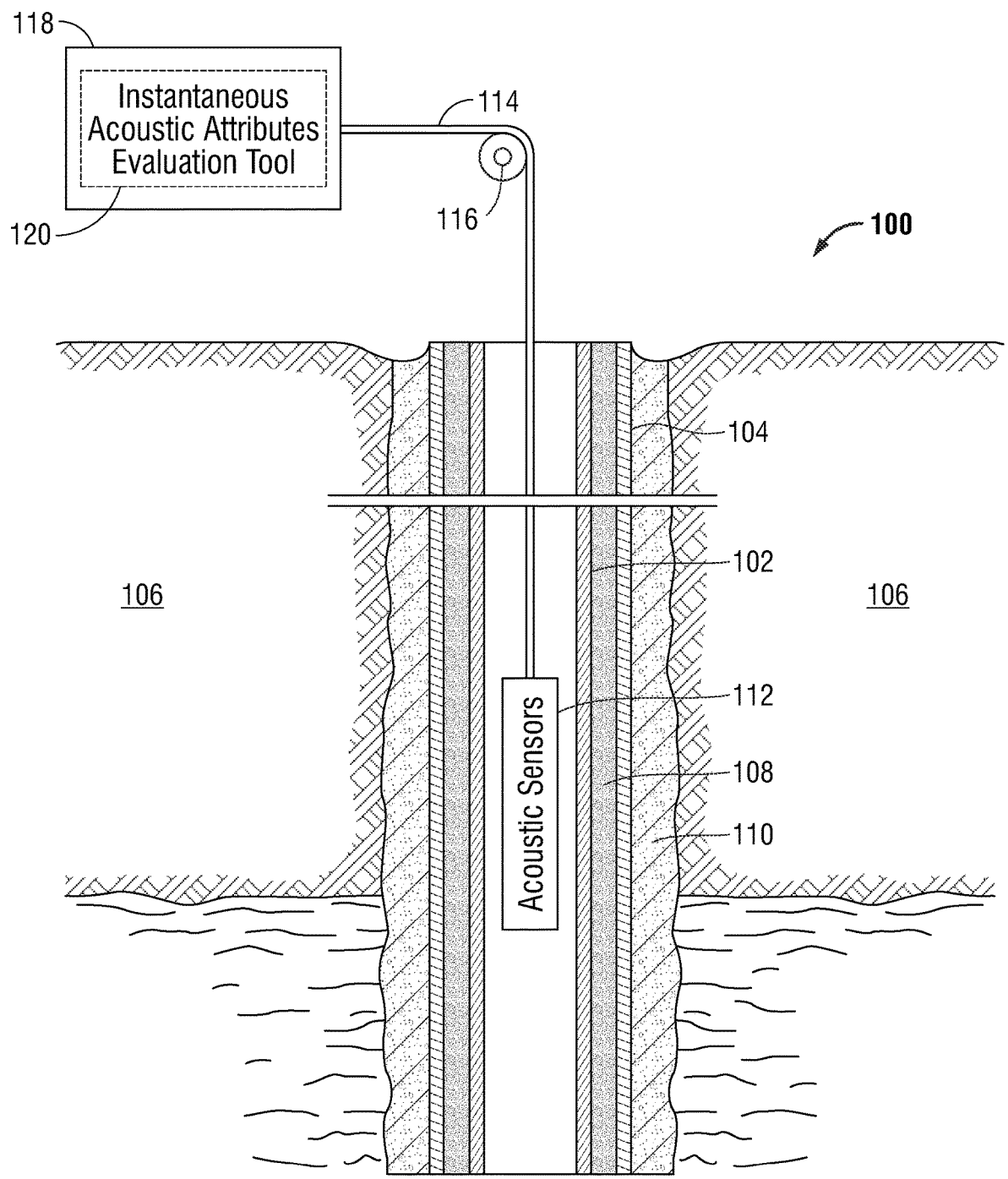
FIG. 1 illustrates an exemplary oil or gas well in which an acoustic attributes evaluation tool may be used according to the disclosed embodiments.

Referring now to FIG. 1, a section of a wellbore 100 is shown for producing hydrocarbon in which one or more of the embodiments disclosed herein may be deployed for evaluating cement bonding. The particular wellbore 100 depicted here has undergone multiple stages of cementing and thus includes a tubing 102 and multiple casing strings (e.g., conductor casing, intermediate casing, production casing) set within the wellbore 100. Only one casing string 104 is expressly shown for economy and clarity purposes. The cementing has resulted in a first cement 108 between the tubing 102 and the casing string 104 and a second cement 110 between the casing string 104 and the formation 106.

To facilitate evaluation of the cement 108 and 110, an acoustic tool 112 having one or one or more acoustic sensors may be lowered into the wellbore 100 down the tubing 102 by wireline 114 in combination with a pulley 116. While depicted with a wireline, other conveyance (e.g., slickline, coiled tubing, pipe—such as a drill string, downhole tractor, or similar equipment) may also be used to lower the acoustic tool 112 into the wellbore 100 in some embodiments. The acoustic tool 112 may be a sonic tool, an ultrasonic tool, or other acoustic tool suitable for collecting acoustic data from the wellbore 100. The acoustic sensors on the tool 112 are typically disposed in a predefined pattern around the tool 112 and include one or more transducers (not expressly shown) capable of emitting acoustic waves into the formation 106. One or more transducers may also be used to record amplitude, frequency, and/or phase data for the acoustic waves returning to the tool 112. This data may then be processed by a material assessment system 118 located either in the acoustic tool 112 or at the surface of the formation 106 proximate the wellbore 100 (i.e., for near real-time evaluation), or at a remote facility. It is also possible to locate a portion of the material assessment system 118 in the acoustic tool 112, a portion at the surface of the formation 106, and/or a portion at a remote facility in some embodiments.

In accordance with the disclosed embodiments, an instantaneous acoustic attributes evaluation application or tool 120 may be provided in the material assessment system 118 for assessing the cement bond quality. Such an instantaneous acoustic attributes evaluation tool 120 may be one of several software applications in the cement bond evaluation system 118 that may be executed for determining the bond quality of the cement in the wellbore 100. As will be discussed herein, the instantaneous acoustic attributes evaluation tool 120 may be designed to use all or multiple waveform attributes from the acoustic spectrum of the acoustic waveform to obtain a more direct and accurate assessment of cement bond quality.

Figure 2:
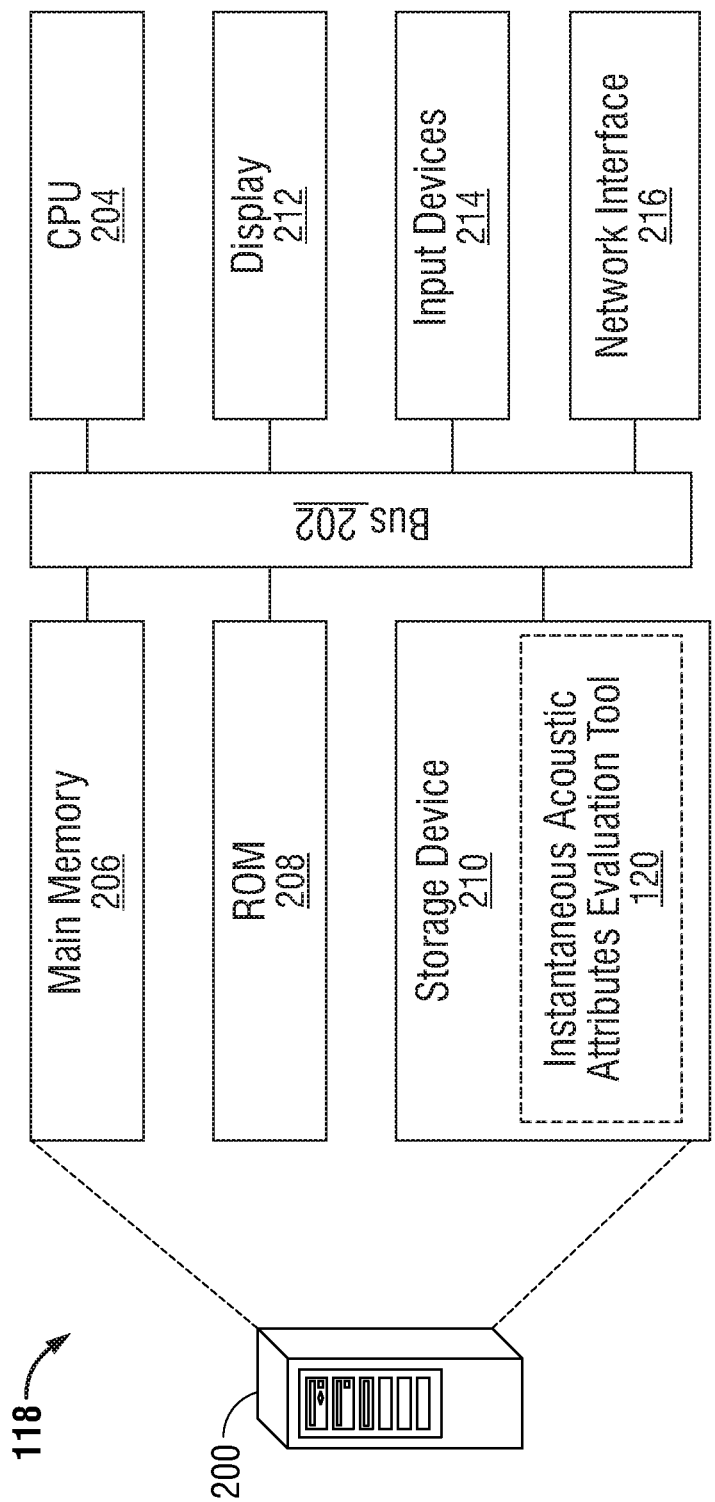
FIG. 2 illustrates an exemplary material assessment system that may be used to run the acoustic attributes evaluation tool according to the disclosed embodiments.

FIG. 2 illustrates an exemplary implementation of the material assessment system 118 that may be used to execute or otherwise operate the evaluation tool 120 described herein. The material assessment system 118 may include a conventional workstation, desktop, or laptop computer, indicated at 200, or it may include a custom computing system developed for a particular application. In a typical arrangement, the computing system 200 includes a bus 202 or other communication pathway for transferring information among other components within the computing system 200, and a CPU 204 coupled with the bus 202 for processing the information. The computing system 200 may also include a main memory 206, such as a random access memory (RAM) or other dynamic storage device coupled to the bus 202 for storing computer-readable instructions to be executed by the CPU 204. The main memory 206 may also be used for storing temporary variables or other intermediate information during execution of the instructions by the CPU 204.

The computing system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more input devices 214, including alphanumeric and other keyboards, mouse, trackball, cursor direction keys, and so forth, may be coupled to the bus 202 for communicating information and command selections to the CPU 204. A communications interface 216 may be provided for allowing the computing system 200 to communicate with an external system or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

In accordance with the disclosed embodiments, the instantaneous acoustic attributes evaluation tool 120, or the computer-readable instructions therefor, may also reside on or be downloaded to the storage device 210 for execution. Such an evaluation tool 120 may be implemented in any suitable computer programming language or software development package known to those having ordinary skill in the art, including various versions of C, C++, FORTRAN, and the like. Users may then use the evaluation tool 120 to derive certain parameters needed to more accurately characterize the cement bonds in the wellbore 100. Operation of the evaluation tool 120 according to some embodiments is explained in more detail below.

Figure 3A:
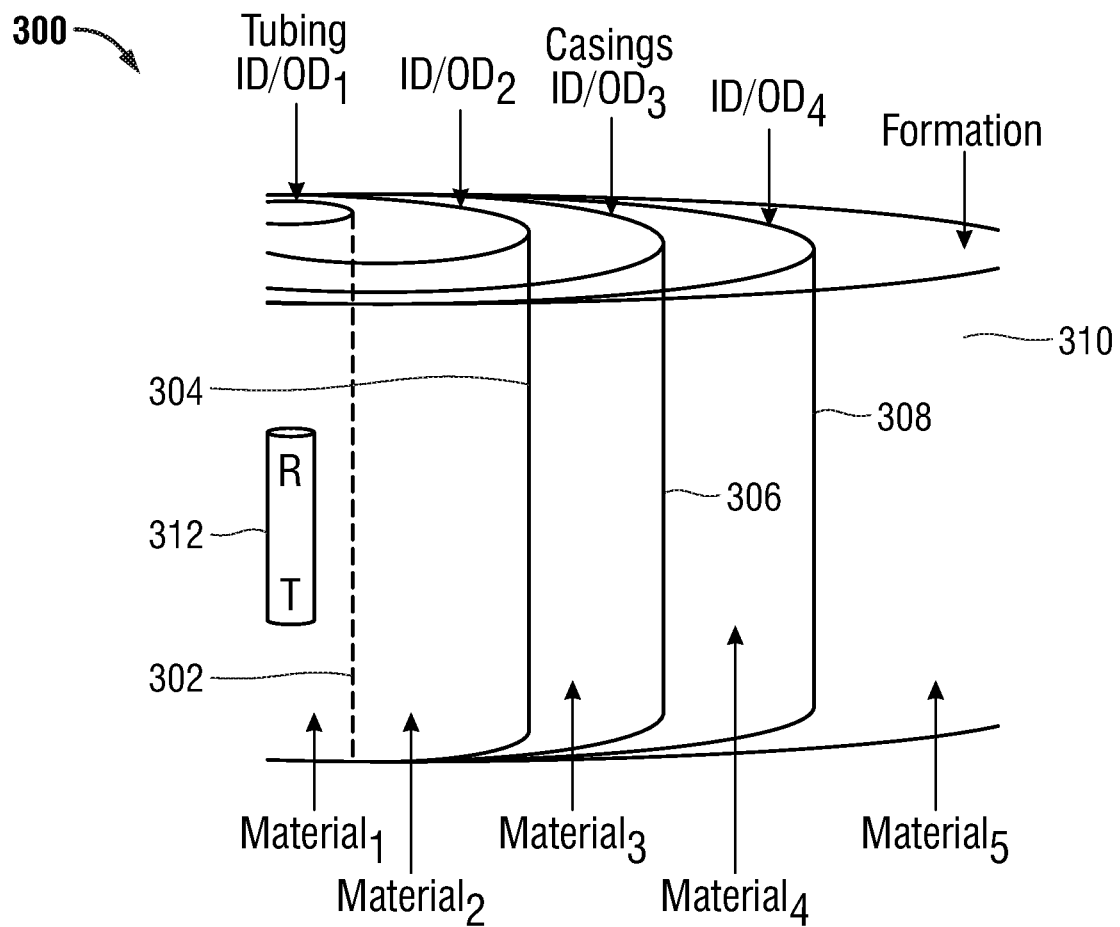
FIGS. 3A-3B illustrate an exemplary section of the borehole in which the acoustic attributes evaluation tool may be used according to the disclosed embodiments.

Referring to FIG. 3A, a perspective view of a section of a borehole 300 in which the evaluation tool 120 may be advantageously employed is shown. The borehole 300 has undergone multiple stages of cementing as evidenced by a tubing 302 and the presence of several casing strings, including a production casing 304, intermediate casing 306, and conductor casing 308. The tubing 302 and the casings 304-308 each have an inner diameter (ID) and an outer diameter (OD) designated as $ID/OD_1$, $ID/OD_2$, $ID/OD_3$, and $ID/OD_4$, respectively, that divide the borehole 302 into several annular regions. The subterranean formation is indicated at 310 and an acoustic tool is indicated at 312. Each region within the tubing 302, between the tubing 302 and the production casing 304, between the various casings 304-308, and between the conductor casing 308 and the formation 310 is filled with a material (i.e., fluid or solid) designated as $Material_1$, $Material_2$, $Material_3$, $Material_4$, and $Material_5$, respectively.

The evaluation tool 120 may then be employed to identify and characterize the materials within the various regions and the distances between each material-tubing/casing interface. In some embodiments, the evaluation tool 120 may use several operational components, including acoustic waveform data, borehole, completion and tubular data, acoustic ray theory, acoustic spectral parameter decomposition, and acoustic impedance equations.

With respect to the acoustic waveform data, this data may be acquired using any well-known wireline or slickline acoustic logging tool and may be composed of sonic data, ultrasonic data, and the like. Sonic data may include cement bond log (CBL), radial cement bond log (RCBL), open-hole mono-pole sonic tools, fiber optics sensors, and the like. Ultrasonic data may include ultrasonic pulse-echo scanner, flexural scanner, fiber optics sensors, and the like.

The borehole, completion, and tubular data used by the evaluation tool 120 may be obtained from readily available well records and the like. Such data may include internal and external pipe diameters for any tubing, liners, casings, heavyweight pipe, collars, steel joints, and the like used in the well. Data on the type of pipe material, such as carbon steel, stainless steel, aluminum, titanium, fiberglass and other materials may also be used. Similarly, borehole diameter obtained either from drill bit size, acoustic calipers (including single, dual, and multi-arm calipers), or from open hole calipers and the like may also be used. The completion fluid is typically brine, but may also be an oil based solution, contaminated mud, or other fluids and additives. The cement type may include light weight, slurry, foamy, and other types of cement.

Figure 3B:
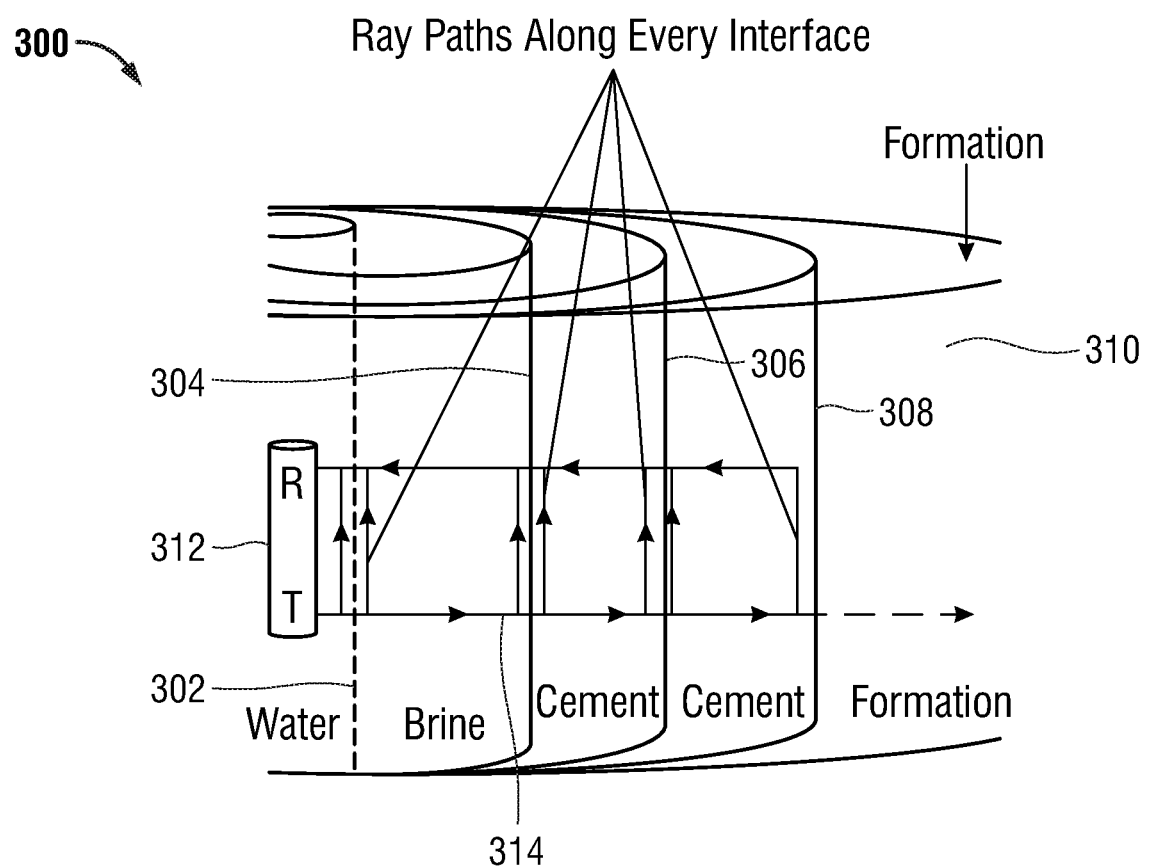

The evaluation tool 120 may make use of ray theory, or plane wave theory, to determine acoustic wave travel times between each material-tubing/casing interface, as depicted in FIG. 3B. In general, propagation of an acoustic wave through a homogenous or semi-homogeneous medium (e.g., water, brine, or other completion fluid) is assumed to travel radially away from its source until it reaches a second medium having different acoustic properties (e.g., steel). At the boundary or interface between the different media, part of the wave is transmitted into the second medium, part of the wave is reflected, and part of the wave is refracted at a critical angle such that it travels along the interface. The exact behavior of the reflection, refraction, and transmission depends on the material properties on both sides of the boundary.

In the case of the borehole 300, an acoustic wave from one or more transmitters T in the tool 312 travels radially outward until it reaches the inner diameter of the tubing 302. Part of the wave then undergoes a critical refraction and travels along the inner surface of the tubing 302 until a secondary critical refraction returns the wave to the tool 312 where it is picked up by one or more receivers R therein. Part of the wave also travels into the tubing 302 until it reaches the outer diameter of the tubing where another critical refraction occurs and the wave is sent along the outer surface of the tubing 302. Part of the wave additionally travels into the material (e.g., cement) between the outer surface of the tubing 302 and the production casing 304 until it reaches the inner diameter of the production casing 304, and so forth.

The paths of the acoustic wave through the borehole 300 are illustrated by lines 314 in FIG. 3B. As can be seen, there is an interface at the inner diameter of every pipe and another interface at the outer diameter of every pipe. The various regions within the tubing and between the casings are filled with water, brine, and cement, respectively, in this example. The last medium is the formation and, assuming it is mostly homogeneous, the wave is expected to dissipate without any further measurable reflection or refraction.

The above reflections and refractions may be affected by certain properties (e.g., density, acoustic velocity, region radial distance, etc.) of the cement and other materials in the borehole 300 and also the properties of the tubing and casings (e.g., density, acoustic velocity, pipe thickness, etc.) in the borehole 300. In particular, these properties may affect the spectral attributes of the reflected and refracted waves, including their amplitudes, instantaneous complex amplitudes, instantaneous frequencies, instantaneous phases and instantaneous relative phases, as well as their frequency distribution, or spectrum, and their first and second order derivatives. The spectral attributes may vary based on the interaction of the reflected/refracted wave with the media, and based on the physical properties of the media through which the acoustic wave propagates. The evaluation tool 120 may extract some or all of these spectral attributes from the acoustic waveform data to derive certain properties of the cement and other materials in the borehole 300.

One of the properties that may be derived for the cement is the characteristic impedance Z of the cement. In general, the characteristic impedance Z of a material is the product of the material density $\rho$ and the acoustic velocity c, or $Z=\rho \cdot c$. If a wave with amplitude $\xi_1$ in medium 1 encounters a boundary with medium 2, the amplitudes of the reflected wave may be given by $\xi_r=(Z_1-Z_2)/(Z_1+Z_2)$ and the amplitude of the wave transmitted into medium 2 may be given by $\xi_2=2Z_1/(Z_1+Z_2)\xi_1$.

Figure 4:
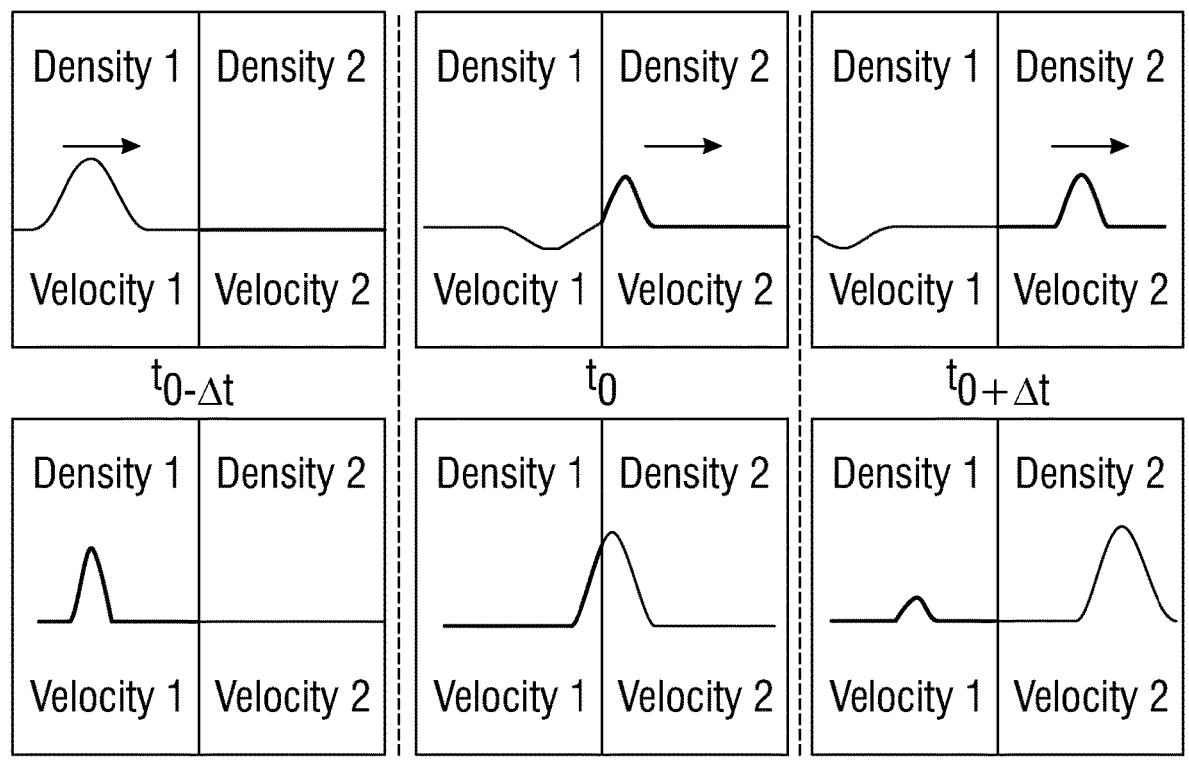
FIG. 4 illustrates the behavior of an acoustic wave passing through media of different densities and acoustic velocities.

An example of an acoustic wave passing through media with different material densities $\rho$ and acoustic velocities c is illustrated in FIG. 4. In the figure, $t_0$ is the interface time, which is the time it takes for the wave to travel from its source to the interface between the media, while $t_{0-\Delta t}$ and $t_{0+\Delta t}$ are the times before and after the wave encounters the interface, respectively. As can be seen, the amplitude, frequency, and phase of the wave may be well defined at $t_{0-\Delta t}$ and $t_{0+\Delta t}$, but these acoustic attributes are changed upon encountering the interface and any or all of the attributes may not be well defined. This change may be used to detect the presence of the interface between the media and measure the time to the interface.

In accordance with the disclosed embodiments, the evaluation tool 120 may be used to estimate or measure the interface times $t_0$, $t_1$, $t_2$, and so forth for each medium in the borehole 300. Once the interface times are obtained, they may be used to determine the acoustic velocity for each medium, which may then be used to determine the acoustic impedance and the density of each medium based on well-known formulas that relate these properties. In this way, characterization of the various regions in the borehole 300 may be achieved in terms of thickness or radii, type of materials, and densities.

Figure 5:
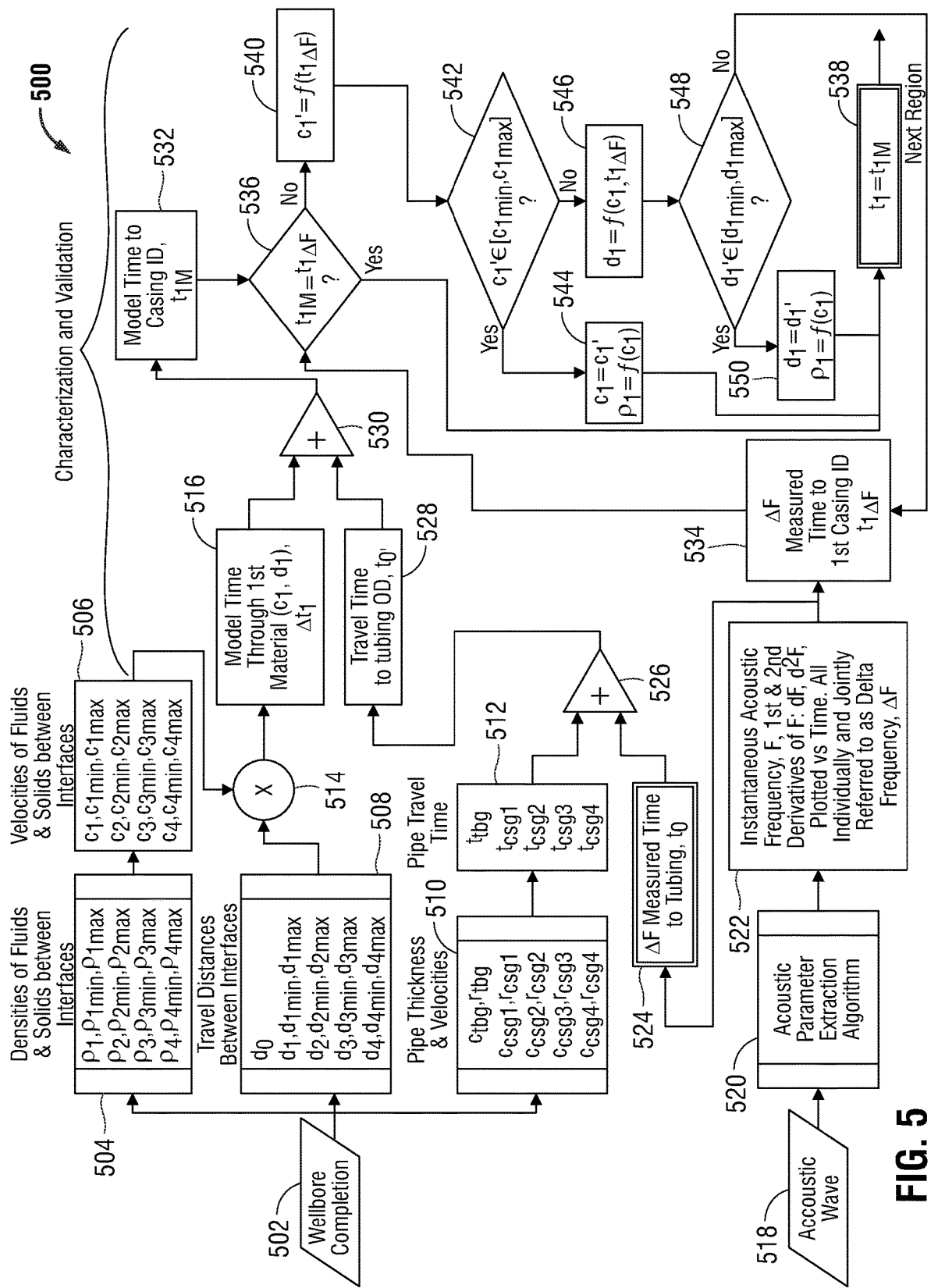
FIG. 5 illustrates an exemplary workflow that may be used with the acoustic attributes evaluation tool according to the disclosed embodiments.

FIG. 5 illustrates an exemplary workflow 500 for determining the interface times $t_0$, $t_1$, $t_2$, and so forth using the evaluation tool 120 according to some embodiments. Among other things, this particular workflow 500 may use several spectral attributes of the acoustic wave to determine the interface times, including the instantaneous acoustic frequency as well as the first derivative of the instantaneous acoustic frequency, the second derivative of instantaneous acoustic frequency, the integral of the absolute value of the instantaneous acoustic frequency, and/or the integral of the absolute value of the derivatives of the instantaneous acoustic frequency. For simplicity, these spectral attributes are referred to jointly and individually as delta frequency $\Delta F$ in the workflow 500. It should be noted, though, that acoustic amplitude A (either waveform amplitude or instantaneous amplitude) and instantaneous acoustic phase $\Phi$ may also be used instead of instantaneous acoustic frequency F in some embodiments to obtain the interface times.

It should also be noted that although FIG. 5 (and other figures herein) depict a number of discrete blocks, those having ordinary skill in the art will understand that any one of these blocks may be divided into two or more constituent blocks and/or two or more of these blocks may be combined into a single block as needed without departing from the scope of the disclosed embodiments. In addition, the workflow 500 may be performed entirely automatically by the material assessment system 118, or portions of the workflow 500 may be performed automatically and portions of the workflow 500 may be performed manually as needed.

As can be seen in FIG. 5, the workflow 500 generally begins at block 502 where wellbore completion data of the type typically obtained as part of a well completion may be provided to the evaluation tool 120. The well completion data may include, or may be used to derive, the densities of the materials (i.e., fluids and solids) in the regions between the various pipes, indicated generally at block 504. Following is a listing of the densities of the materials between the tubing, the 1st, 2nd, 3rd, and 4th casings, and the formation:

| | |
|---|---|
| $\rho_1$ | Density of fluid between Tubing and 1st Casing or Formation |
| $\rho_2$ | Density of material between 1st Casing and 2nd Casing or Formation |
| $\rho_3$ | Density of material between 2nd Casing and 3rd Casing or Formation |
| $\rho_4$ | Density of material between 3rd Casing and 4th Casing or Formation |
| $\rho_{1min}$ | Minimum density of fluid between Tubing and 1st Casing or Formation |
| $\rho_{2min}$ | Minimum density of fluid between 1st Casing and 2nd Casing or Formation |
| $\rho_{3min}$ | Minimum density of fluid between 2nd Casing and 3rd Casing or Formation |
| $\rho_{4min}$ | Minimum density of fluid between 3rd Casing and 4th Casing or Formation |
| $\rho_{1max}$ | Maximum density of fluid between Tubing and 1st Casing or Formation |
| $\rho_{2max}$ | Maximum density of fluid between 1st Casing and 2nd Casing or Formation |
| $\rho_{3max}$ | Maximum density of fluid between 2nd Casing and 3rd Casing or Formation |
| $\rho_{4max}$ | Maximum density of fluid between 3rd Casing and 4th Casing or Formation |

This density data may then be used in a manner known to those having ordinary skill in the art to derive the acoustic velocities of the materials (i.e., fluids and solids) in the regions between the various pipes and also the formation, indicated generally at block 506, including:

| | |
|---|---|
| $c_1$ | Velocity of fluid between Tubing and 1st Casing or Formation |
| $c_2$ | Velocity of material between 1st Casing and 2nd Casing or Formation |
| $c_3$ | Velocity of material between 2nd Casing and 3rd Casing or Formation |
| $c_4$ | Velocity of material between 3rd Casing and 4th Casing or Formation |
| $c_{1min}$ | Minimum velocity of fluid between Tubing and 1st Casing or Formation |
| $c_{2min}$ | Minimum velocity of fluid between 1st Casing and 2nd Casing or Formation |
| $c_{3min}$ | Minimum velocity of fluid between 2nd Casing and 3rd Casing or Formation |
| $c_{4min}$ | Minimum velocity of fluid between 3rd Casing and 4th Casing or Formation |
| $c_{1max}$ | Maximum velocity of fluid between Tubing and 1st Casing or Formation |
| $c_{2max}$ | Maximum velocity of fluid between 1st Casing and 2nd Casing or Formation |
| $c_{3max}$ | Maximum velocity of fluid between 2nd Casing and 3rd Casing or Formation |
| $c_{4max}$ | Maximum velocity of fluid between 3rd Casing and 4th Casing or Formation |

The well completion data may further include, or may be used to derive, the travel distances between the various pipes and the formation, indicated generally at block 508, including:

| | |
|---|---|
| $d_1$ | Calculated travel distance between Tubing OD and 1st Casing ID or Formation |
| $d_2$ | Calculated travel distance between 1st Casing OD and 2nd Casing ID or Formation |
| $d_3$ | Calculated travel distance between 2nd Casing OD and 3rd Casing ID or Formation |
| $d_4$ | Calculated travel distance between 3rd Casing OD and 4th Casing ID or Formation |
| $d_{1min}$ | Minimum calculated travel distance between Tubing OD and 1st Casing ID or |

| | |
|---|---|
| | Formation |
| $d_{2min}$ | Minimum calculated travel distance between 1st Casing OD and 2nd Casing ID or Formation |
| $d_{3min}$ | Minimum calculated travel distance between 2nd Casing OD and 3rd Casing ID or Formation |
| $d_{4min}$ | Minimum calculated travel distance between 3rd Casing OD and 4th Casing ID or Formation |
| $d_{1max}$ | Maximum calculated travel distance between Tubing OD and 1st Casing ID or Formation |
| $d_{2max}$ | Maximum calculated travel distance between 1st Casing OD and 2nd Casing ID or Formation |
| $d_{3max}$ | Maximum calculated travel distance between 2nd Casing OD and 3rd Casing ID or Formation |
| $d_{4max}$ | Maximum calculated travel distance between 3rd Casing OD and 4th Casing ID or Formation |

As well, the well completion data may include, or may be used to derive, the pipe thickness and acoustic velocities for the various pipes, indicated generally at block 510, including:

| | |
|---|---|
| $c_{tbg}$ | Specified or nominal acoustic compressional velocity of material of Tubing at frequency of incoming wave |
| $c_{csg1}$ | Specified or nominal acoustic compressional velocity of material of 1st Casing at frequency of incoming wave |
| $c_{csg2}$ | Specified or nominal acoustic compressional velocity of material of 2nd Casing at frequency of incoming wave |
| $c_{csg3}$ | Specified or nominal acoustic compressional velocity of material of 3rd Casing at frequency of incoming wave |
| $c_{csg4}$ | Specified or nominal acoustic compressional velocity of material of 4th Casing at frequency of incoming wave |
| $r_{tbg}$ | Specified or nominal thickness of Tubing |
| $r_{csg1}$ | Specified or nominal thickness of 1st Casing |
| $r_{csg2}$ | Specified or nominal thickness of 2nd Casing |
| $r_{csg3}$ | Specified or nominal thickness of 3rd Casing |
| $r_{csg4}$ | Specified or nominal thickness of 4th Casing |

This acoustic velocity and pipe thickness data may then be used in a manner known to those having ordinary skill in the art to derive the travel times through the various pipes, indicated generally at block 512, including:

| | |
|---|---|
| $t_{tbg}$ | Calculated travel time through Tubing |
| $t_{csg1}$ | Calculated travel time through 1st Casing |
| $t_{csg2}$ | Calculated travel time through 2nd Casing |
| $t_{csg3}$ | Calculated travel time through 3rd Casing |
| $t_{csg4}$ | Calculated travel time through 4th Casing |

Figure 6:
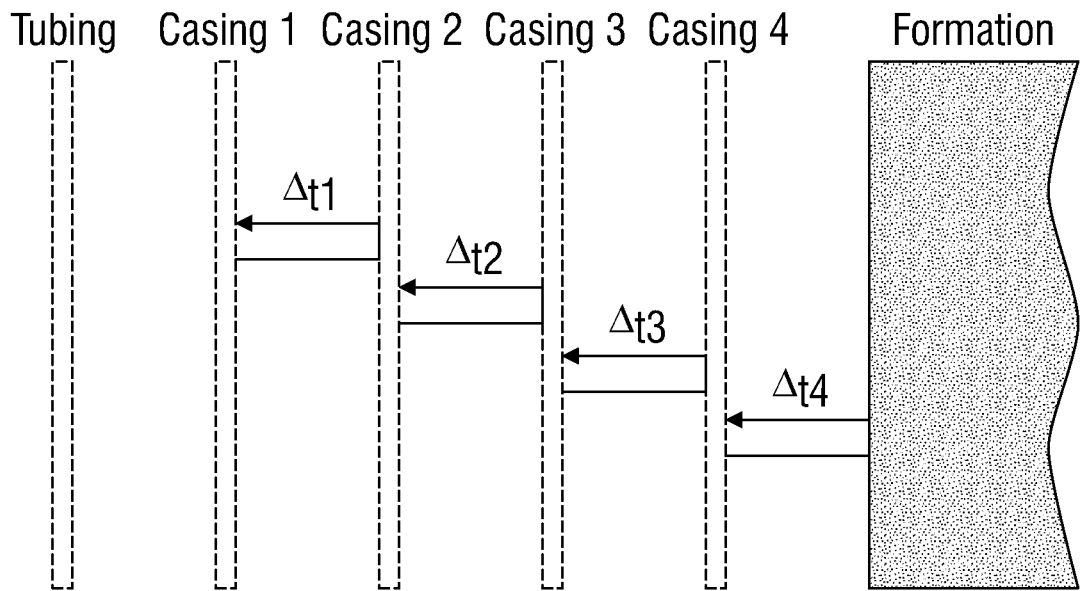
FIG. 6 illustrates exemplary modeled interface times that may be used with the acoustic attributes evaluation tool according to the disclosed embodiments.

Thereafter, the acoustic velocity data derived at block 506 and the travel distances obtained at block 508 may be multiplied by a multiplier 512 to approximate or model the travel times through the various materials. For example, as seen in block 514, multiplying the calculated travel distance $d_1$ between the tubing outer diameter and the 1st casing inner diameter and the inverse of the velocity $c_1$ of the material (i.e., fluid) between tubing and the 1st casing produces a first material travel time $\Delta_{t1}$. This material travel time represents the total travel time it took an acoustic wave to travel from the tubing through the material between the tubing and the 1st casing, and return back to the tubing. Following is a listing of the relevant material travel times, which are also illustrated in FIG. 6, for the present example:

| | |
|---|---|
| $\Delta_{t1}$ | Total travel time of the planar wave (acoustic ray) to travel through the first material (fluid or solid) after the tubing OD, encounter the 1st Casing and returns to the tubing OD. |
| $\Delta_{t2}$ | Total travel time of the planar wave (acoustic ray) to travel through the second material (fluid or solid) after the 1st Casing OD, encounter the 2nd Casing or Formation, and returns to the 1st Casing OD. |
| $\Delta_{t3}$ | Total travel time of the planar wave (acoustic ray) to travel through the third material (fluid or solid) after the 2nd Casing OD, encounter the 3rd Casing or Formation, and returns to the 2nd Casing OD. |
| $\Delta_{t4}$ | Total travel time of the planar wave (acoustic ray) to travel through the fourth material (fluid or solid) after the 3rd Casing OD, encounter the 4th Casing or Formation, and returns to the 3rd Casing OD. |

Turning back to FIG. 5, the acoustic waveform data mentioned above may be provided to the evaluation tool 120 at block 518. As discussed, such acoustic waveform data may be any type of data that may be obtained using sonic tools and/or ultrasonic tools and may include, for example, waveform amplitude versus time data, as well as the data acquisition time scale, sampling rate, gain settings, any delays used, and the like. At block 520, an acoustic parameter extraction algorithm in the evaluation tool 120 extracts various instantaneous acoustic parameters from the acoustic waveform data. In the embodiment shown here, the instantaneous acoustic parameters extracted by the algorithm at block 520 may include the instantaneous acoustic frequency F, first and (optionally) second derivatives of F (i.e., dF and $d^2F$), integral of the absolute values of F, and/or integral of the absolute values of the derivatives of F.

Figure 7A:
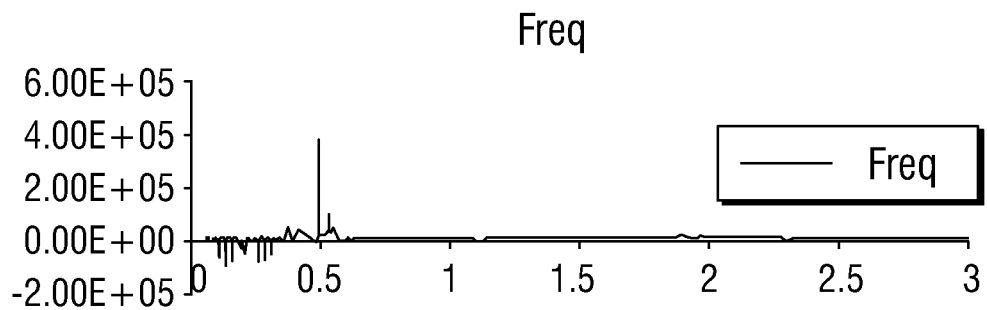
FIGS. 7A-7C are exemplary graphs of an acoustic attribute extracted by the acoustic attributes evaluation tool according to the disclosed embodiments.
Figure 7B:
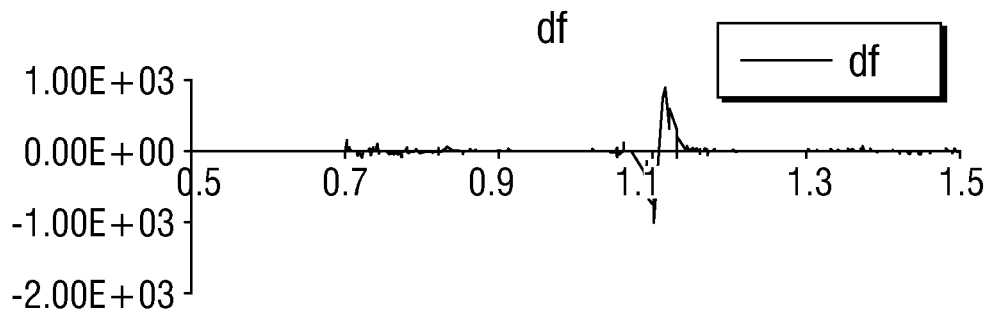
Figure 7C:
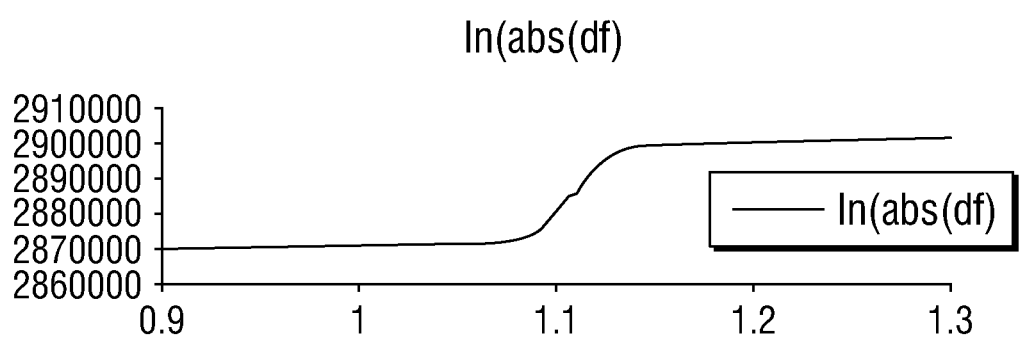

FIGS. 7A-7B are graphs of the above instantaneous frequency F, first derivatives dF, and integral of the absolute values of dF, respectively, plotted versus time (ms). As can be seen in FIG. 7A, the instantaneous frequency of the acoustic wave varies with time as expected. The derivative of the instantaneous frequency, FIG. 7B, shows that there is a discontinuity around 1.1 ms in this example. The integral of the absolute values of the derivative of the instantaneous frequency, FIG. 7C, shows a similar discontinuity around 1.1 ms in this example. In accordance with the disclosed embodiments, the time of the discontinuity may be measured and used as an interface time, which is the time it took for an acoustic wave to encounter an interface. This measurement of the interface time is typically done manually by a user after reviewing the various graphs and underlying data, but may also be performed automatically by the evaluation tool 120 in some embodiments using peak detection algorithms and the like.

Turning again to FIG. 5, the graphs of the instantaneous frequency F, first derivatives dF, and integral of the absolute values of dF obtained at block 522 may be used to measure (either manually or automatically) the interface time $t_{0_{\Delta F}}$ for the inner diameter of the tubing at block 534. This interface time $t_{0_{\Delta F}}$ may then be set as the initial interface time $t_0$, which is the time to the tubing inner diameter, at block 524. The interface time $t_0$ may then be added to the pipe travel time $t_{tbg}$ for the tubing (from block 512) by an adder 526 to produce an interface time $t'_0$ that represents the travel time to the tubing outer diameter, indicated at block 528. The travel time $t'_0$ may then be added to the material travel time $\Delta_{t1}$ for the material between the tubing and the 1st casing (from block 516) by another adder 530 to approximate or model the time to the 1st casing inner diameter $t_{1_M}$, at block 532.

Figure 8:
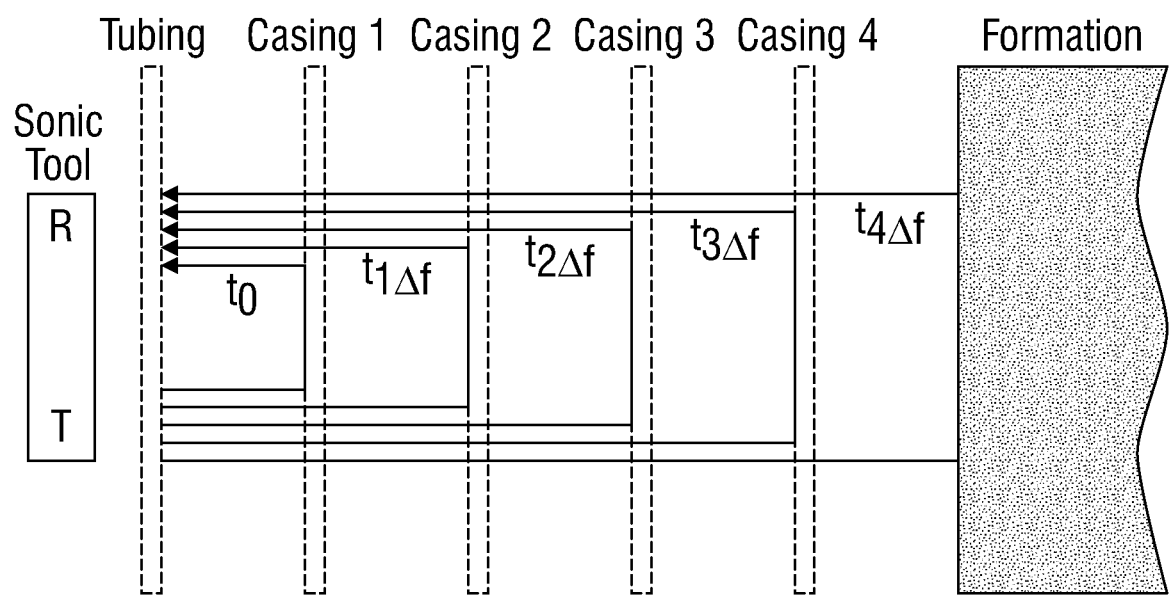
FIG. 8 illustrates exemplary measured interface times that may be used with the acoustic attributes evaluation tool according to the disclosed embodiments.

In the meantime, referring back to block 534, the instantaneous acoustic parameters extracted by the acoustic parameter extraction algorithm at block 520 and plotted versus time at block 522 may be used to measure another interface time $t_{1_{\Delta F}}$, which is the time it took for the acoustic wave to encounter the inner diameter of the 1st casing. Following is a listing of the interface times that may be measured, which are also illustrated in FIG. 8, for the present example:

| | |
|---|---|
| $t_{0_{\Delta F}}$ | Total travel time of the planar wave (acoustic ray) to travel from the acoustic emitter through the fluid where the tool is immersed (fluid zero), encounter the tubing and return to reach the acoustic receiver; used as initial interface time $t_0$. |
| $t_{1_{\Delta F}}$ | Total travel time including $t_{0_{\Delta F}}$ plus the extra time that the planar wave (acoustic ray) travels radially through the tubing and through the first material (fluid or solid), and encounters the 1st Casing and returns to reach the acoustic receiver. |
| $t_{2_{\Delta F}}$ | Total travel time including $t_{1_{\Delta F}}$ plus the extra time that the planar wave (acoustic ray) travels radially through the 1st Casing and through the second material (fluid or solid), and encounters the 2nd Casing or Formation rock and returns to reach the acoustic receiver. |
| $t_{3_{\Delta F}}$ | Total travel time including $t_{2_{\Delta F}}$ plus the extra time that the planar wave (acoustic ray) travels radially through the 2nd Casing and through the third material (fluid or solid), and encounters the 3rd Casing or Formation rock and returns to reach the acoustic receiver. |
| $t_{4_{\Delta F}}$ | Total travel time including $t_{3_{\Delta F}}$ plus the extra time that the planar wave (acoustic ray) travels radially through the 3rd Casing and through the fourth material (fluid or solid), and encounters the 4th Casing or Formation rock and returns to reach the acoustic receiver. |

In general, in the above list, $t_{n_{\Delta F}}$ is the total travel time composed of $t_{(n-1)_{\Delta F}}$ plus the extra time that the planar wave (acoustic ray) travels radially through the $(n-1)^{th}$ casing and through the $n^{th}$ material (i.e., fluid or solid) before encountering the $n^{th}$ casing or formation rock and returning to the acoustic receiver.

Referring again to FIG. 5, the interface time $t_{1_{\Delta F}}$ from block 534 may then be compared to the approximated or modeled time to the 1st casing inner diameter $t_{1_M}$ from block 532. If the absolute difference between $t_{1_{\Delta F}}$ and $t_{1_M}$ is smaller than a predetermined threshold (e.g., one standard deviation), then the two values are deemed to be equal and the value of the acoustic velocity $c_1$ assumed (or derived) in block 506 is validated, and therefore the density $\rho_1$ used for the material in the first region may be considered to be appropriate. Thereafter, $t_{1_M}$ may be set as the interface time $t_1$ for the 1st casing at block 538 and subsequently used as the input to block 524 for the analysis of the next region, and so on.

If the absolute difference between $t_{1_{\Delta F}}$ and $t_{1_M}$ is larger than a predetermined threshold (e.g., one standard deviation), then the values are deemed to be not equal, and a new acoustic velocity $c'_1$ for the material between the tubing and the 1st casing (or formation) is selected or assumed at block 540 until $t_{1_{\Delta F}}$ and $t_{1_M}$ are equal. Once these two values are considered to be equal, a determination may be made at block 542 whether the newly assumed acoustic velocity $c'_1$ lies between the possible real and expected values of velocity for the material in this region. For example, the acoustic velocity of water may be used as the minimum velocity and the acoustic velocity of a very fast cement may be used as the maximum velocity. If the determination is yes, then the system is solved, the newly assumed value of acoustic velocity $c'_1$ is validated, and the density $\rho_1$ used for the material is appropriate. The workflow 500 thereafter proceeds to block 538 as discussed above.

However, if the newly assumed acoustic velocity does not lie between the possible real and expected values of velocity, then the system is not solved. In that case, a new value of travel distance $d'_1$ between the tubing outer diameter and 1st casing inner diameter is assumed at block 546, resulting in a corresponding new acoustic velocity $c'_1$, until $t_{1_{\Delta F}}$ and $t_{1_M}$ are equal. Once these two values are considered to be equal, a determination may be made at block 548 whether the newly assumed travel distance $d'_1$ lies between the possible real and expected values of travel distance for the material in this region. If the determination is yes, then the system is solved, and the newly assumed value of travel distance $d'_1$ is validated and the density $\rho_1$ used for the material is appropriate. The workflow 500 thereafter proceeds to block 538 as discussed above.

In the event the travel distance for this region does not lie between the possible real and expected values of distance, then the system is not solved, and a new value is obtained (e.g., measured, selected) representing the time $t_{1_{\Delta F}}$ that the acoustic (compressional) wave took to reach the 1st casing inner diameter, at block 534. The workflow 500 may then return to block 536 and the process repeated as described above.

Figure 9:
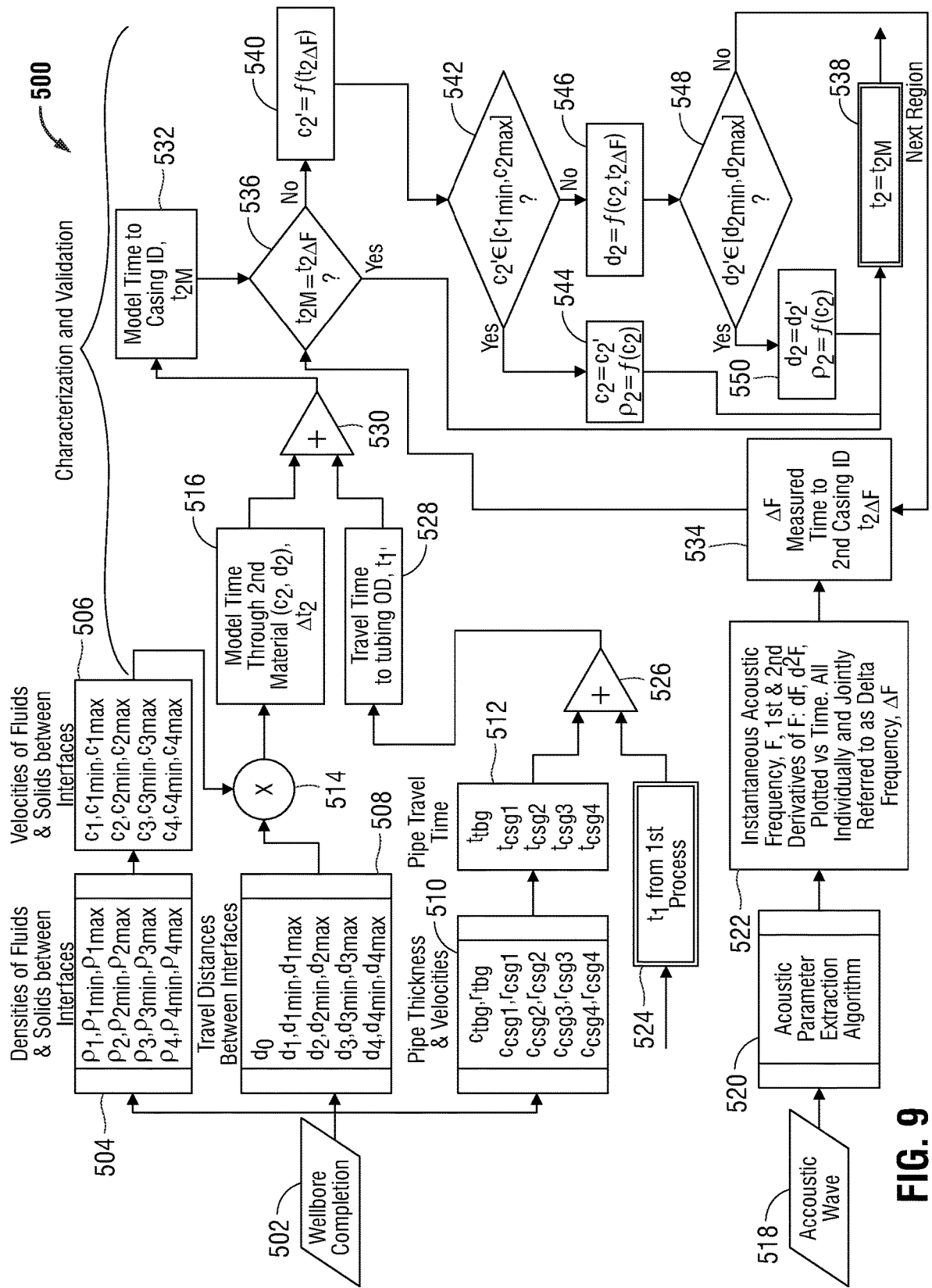
FIG. 9 illustrates another exemplary workflow that may be used with the acoustic attributes evaluation tool according to the disclosed embodiments.

Once $t_1$ is obtained and validated and, the material occupying the first region is considered to be characterized in terms of density, acoustic velocity and travel distance and the workflow 500 may be used for the second region, as depicted in FIG. 9.

While the focus thus far has been on instantaneous frequency attributes, as alluded to above, instantaneous phase attributes and/or amplitude (waveform amplitude and/or instantaneous amplitude) attributes may also be used with the workflow 500 instead of, or in addition to, the instantaneous frequency attributes.

Figure 10:
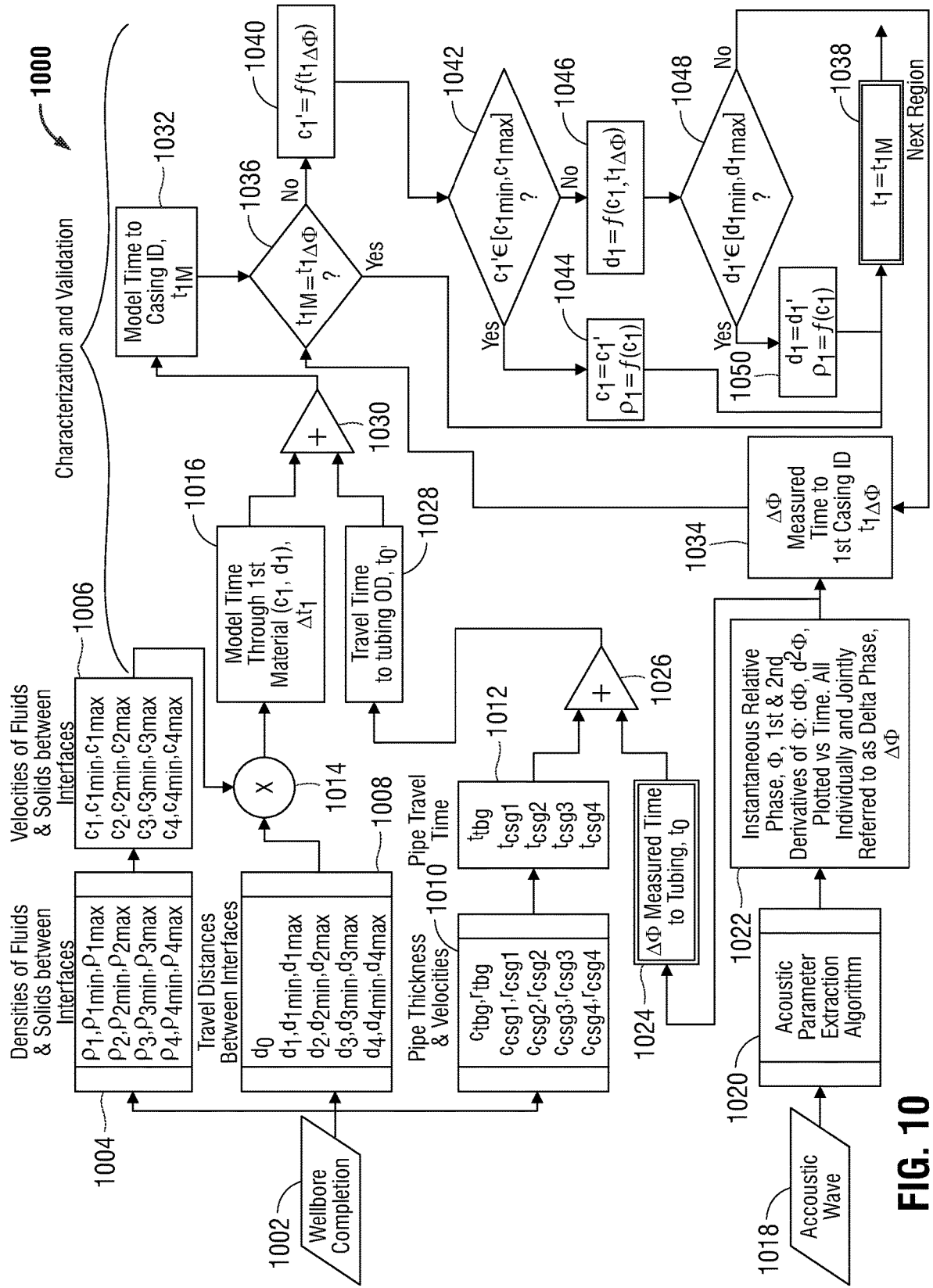
FIG. 10 illustrates yet another exemplary workflow that may be used with the acoustic attributes evaluation tool according to the disclosed embodiments.
Figure 11A:
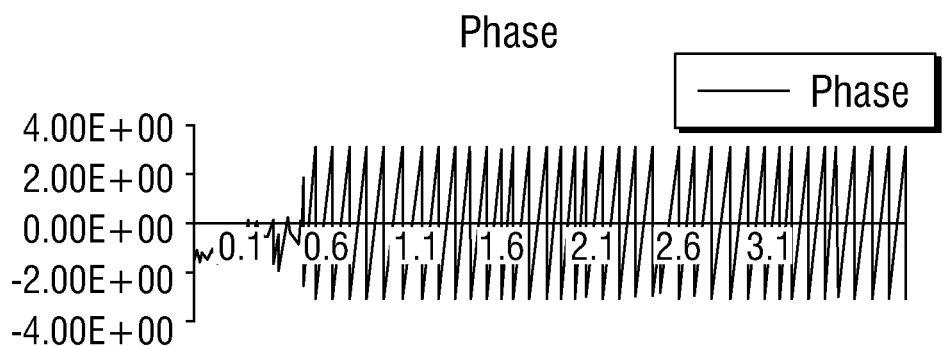
FIGS. 11A-11C are exemplary graphs of another acoustic attribute extracted by the acoustic attributes evaluation tool according to the disclosed embodiments.
Figure 11B:
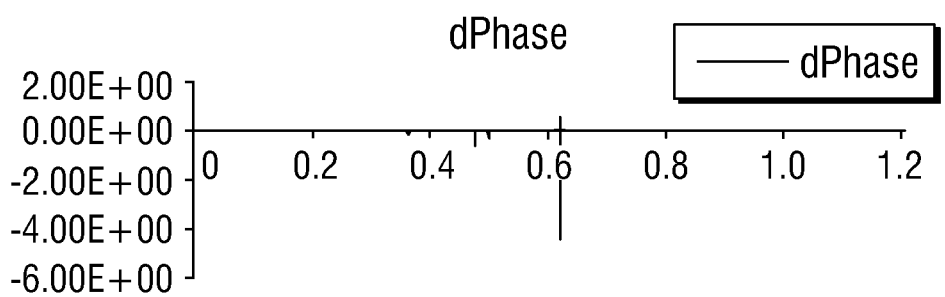
Figure 11C:
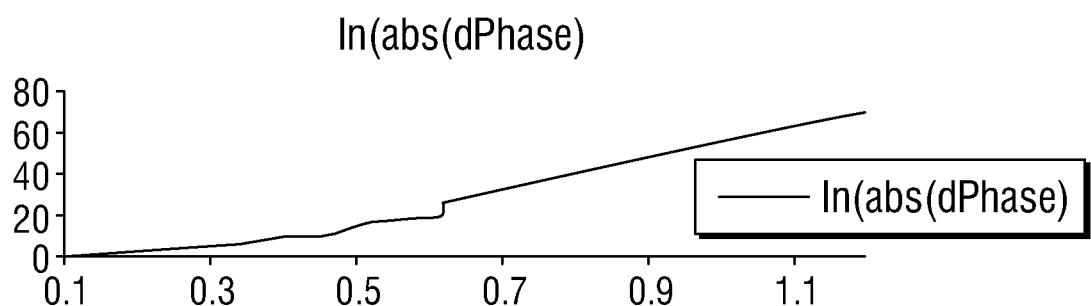

FIG. 10 depicts an alternative workflow 1000 that may be used with the evaluation tool 120 in some embodiments. The workflow 1000 is otherwise similar to the workflow 500 of FIG. 5 except that the workflow 1000 uses instantaneous phase attributes ΔΦ instead of (or in addition to) instantaneous frequency attributes ΔF. Examples of these instantaneous phase attributes ΔΦ are illustrated in FIGS. 11A-11C, which show graphs of the instantaneous phase Φ, first derivatives dΦ, and integral of the absolute values of dΦ, respectively, plotted versus time (ms).

Figure 12:
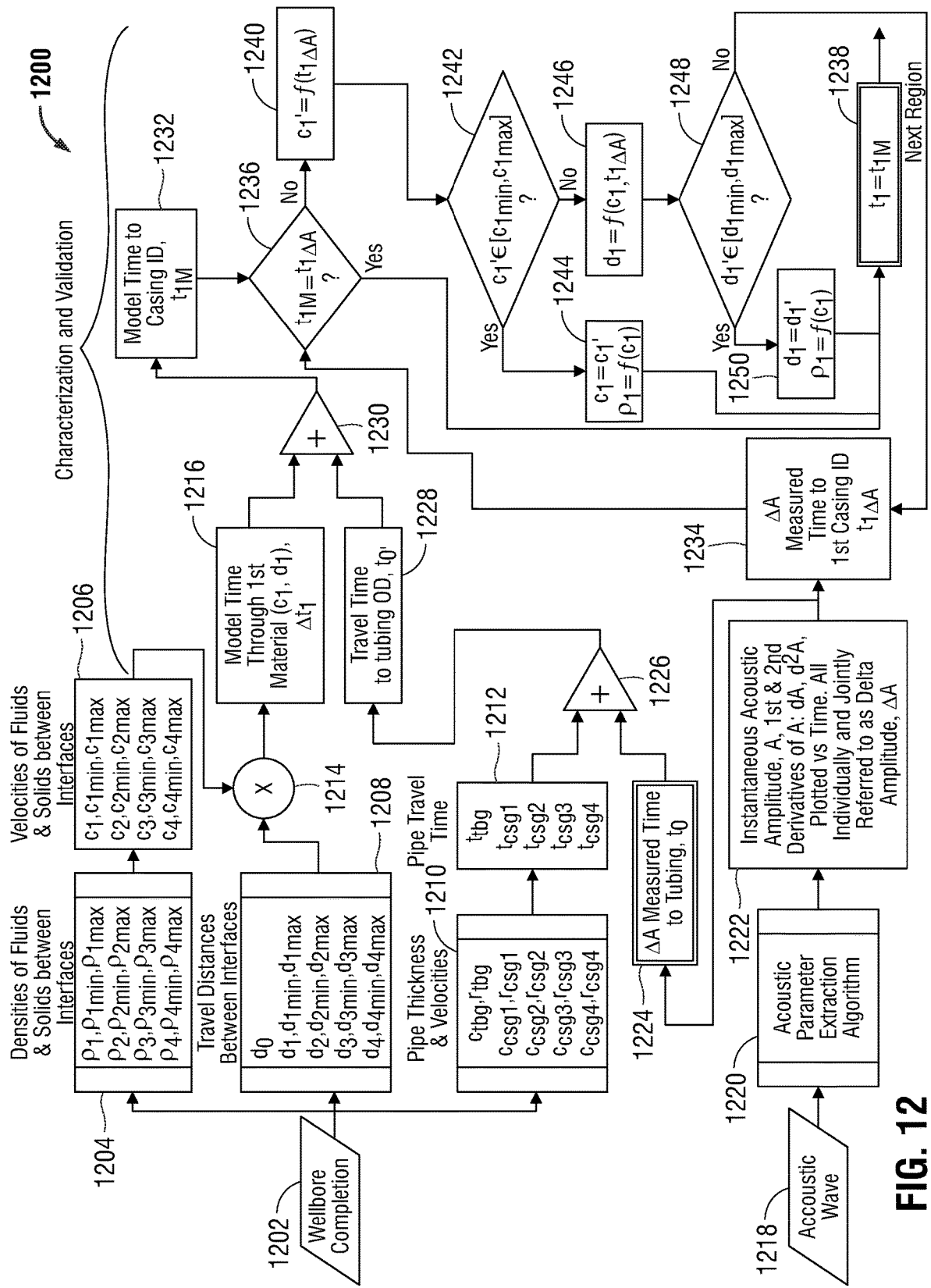
FIG. 12 illustrates still another exemplary workflow that may be used with the acoustic attributes evaluation tool according to the disclosed embodiments.

FIG. 12 depicts another alternative workflow 1200 that may be used with the evaluation tool 120 in some embodiments. The workflow 1200 is also otherwise similar to the workflow 500 of FIG. 5 except that the workflow 1200 uses instantaneous amplitude attributes ΔA instead of (or in addition to) instantaneous frequency attributes ΔF (and instantaneous phase attributes ΔΦ).

Thus, as set forth above, the embodiments disclosed herein may be implemented in a number of ways. For example, in general, in one aspect, the disclosed embodiments relate to a computer-based system for characterizing material in a wellbore in a subterranean formation, the wellbore having a tubing and multiple casing strings. The computer-based system comprises, among other things, an acoustic tool disposed within the wellbore, the acoustic tool configured to transmit acoustic waves into the formation and record acoustic waves returning from the formation, and a material assessment system configured to receive acoustic data representing the acoustic waves recorded by the acoustic tool. The computer-based system further comprises an acoustic attributes evaluation tool residing in the material assessment system, the acoustic attributes evaluation tool being operable to extract one or more acoustic attributes, including instantaneous acoustic attributes, from the acoustic data and compare a measured interface time derived from the instantaneous acoustic attributes with a modeled interface time derived from wellbore completion data for a material between the tubing and a casing string, between adjacent casing strings, or between a casing string and the formation. The acoustic attributes evaluation tool is further operable to set the modeled interface time as the interface time for the material if an absolute difference between the modeled interface time and the measured interface time is within a predefined threshold.

In general, in another aspect, the disclosed embodiments relate to a method for characterizing material in a wellbore in a subterranean formation, the wellbore having a tubing and multiple casing strings. The method comprises, among other things, transmitting acoustic waves into the borehole and recording acoustic waves returning from the wellbore, receiving acoustic data representing the recorded acoustic waves returning from the formation, and extracting one or more acoustic attributes, including instantaneous acoustic attributes, from the acoustic data representing the recorded acoustic waves. The method further comprises comparing a measured interface time derived from the acoustic attributes with a modeled interface time derived from wellbore completion data for a material between the tubing and a casing string, between adjacent casing strings, or between a casing string and the formation. The modeled interface time is set as the interface time for the material if an absolute difference between the modeled interface time and the measured interface time is within a predefined threshold.

In general, in yet another aspect, the disclosed embodiments relate to a computer-readable medium storing computer-readable instructions thereon for characterizing material in a wellbore in a subterranean formation, the wellbore having a tubing and multiple casing strings. The computer-readable instructions cause a computing system to, among other things, receive acoustic data representing recorded acoustic waves returning from the formation and extract one or more acoustic attributes, including instantaneous acoustic attributes, from the acoustic data representing the recorded acoustic waves. The computer-readable instructions further cause the computing system to compare a measured interface time derived from the acoustic attributes with a modeled interface time derived from wellbore completion data for a material between the tubing and a casing string, between adjacent casing strings, or between a casing string and the formation. The modeled interface time is set as the interface time for the material if an absolute difference between the modeled interface time and the measured interface time is within a predefined threshold.

In some embodiments, the material is one of: cement, brine, or water. In some embodiments, the acoustic attributes extracted by the acoustic attributes evaluation tool include one or more of: instantaneous acoustic frequency, acoustic amplitude (including waveform amplitude and instantaneous amplitude), or instantaneous acoustic phase.

In some embodiments, the acoustic attributes evaluation tool is further operable to generate one or more of: a first derivative of the acoustic attribute, a second derivative of the acoustic attribute, an integral of the absolute value of the acoustic attribute, or an integral of the absolute value of a derivative of the acoustic attribute.

In some embodiments, the modeled interface time is derived using an assumed acoustic velocity for the material and the acoustic attributes evaluation tool is further operable to assume a new acoustic velocity for the material if the absolute difference between the modeled interface time and the measured interface time is outside the predefined threshold.

In some embodiments, the modeled interface time is derived using an assumed density for the material and the acoustic attributes evaluation tool is further operable to assume a new density for the material if the new acoustic velocity is outside a predefined minimum and maximum velocity.

In some embodiments, the acoustic attributes evaluation tool is further operable to derive a new measured interface time if the new density is outside a predefined minimum and maximum density.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. A system for characterizing material in a wellbore in a subterranean formation, the wellbore having a tubing and multiple casing strings, comprising:

an acoustic tool disposed within the wellbore, wherein the wellbore includes at least a first casing string, and second casing string, and a material different from a material of at least one of the casing strings between the first casing string and the second casing string, wherein the material is cement, the acoustic tool configured to transmit acoustic waves into the subterranean formation and record acoustic waves returning from the subterranean formation;

a material assessment system configured to receive acoustic data representing the acoustic waves recorded by the acoustic tool; and an acoustic attributes evaluation tool residing in the material assessment system, the acoustic attributes evaluation tool being operable to extract one or more acoustic attributes, including instantaneous acoustic attributes, from the acoustic data and compare a measured interface time derived from the acoustic attributes with a modeled interface time derived from wellbore completion data for a material between the tubing and a casing string, between adjacent casing strings, or between a casing string and the subterranean formation; wherein the acoustic attributes evaluation tool is further operable to set the modeled interface time as the interface time for the material if an absolute difference between the modeled interface time and the measured interface time is within a predefined threshold, wherein the acoustic attributes extracted by the acoustic attributes evaluation tool include one or more of: instantaneous acoustic frequency, acoustic amplitude, including waveform amplitude or instantaneous amplitude, or instantaneous acoustic phase, wherein the acoustic attributes evaluation tool is further operable to generate one or more of: a first derivative of the acoustic attribute, a second derivative of the acoustic attribute, an integral of the absolute value of the acoustic attribute, or an integral of the absolute value of a derivative of the acoustic attribute, and wherein the modeled interface time is derived using an assumed acoustic velocity for the material and the acoustic attributes evaluation tool is further operable to assume a new acoustic velocity for the material if the absolute difference between the modeled interface time and the measured interface time is outside the predefined threshold.

2. The system of claim 1, wherein the material is one of: cement, brine, or water.

3. The system of claim 1, wherein the acoustic attributes extracted by the acoustic attributes evaluation tool include one or more of: instantaneous acoustic frequency, acoustic amplitude, including waveform amplitude and or instantaneous amplitude, or instantaneous acoustic phase.

4. The system of claim 3, wherein the acoustic attributes evaluation tool is further operable to generate one or more of: a first derivative of the acoustic attribute, a second derivative of the acoustic attribute, an integral of the absolute value of the acoustic attribute, or an integral of the absolute value of a derivative of the acoustic attribute.

5. A method for characterizing material in a wellbore in a subterranean formation, the wellbore having a tubing and multiple casing strings, comprising:
transmitting acoustic waves into at least a first casing string, a second casing string, and a material different from a material of at least one of the casing strings located between the first casing string and the second casing string of the wellbore, wherein the material is cement and recording acoustic waves returning from the wellbore;
receiving acoustic data representing the recorded acoustic waves returning from the subterranean formation; and
extracting one or more acoustic attributes, including instantaneous acoustic attributes, from the acoustic data representing the recorded acoustic waves;
comparing a measured interface time derived from the acoustic attributes with a modeled interface time derived from wellbore completion data for a material between the tubing and a casing string, between adjacent casing strings, or between a casing string and the subterranean formation; and
setting the modeled interface time as the interface time for the material if an absolute difference between the modeled interface time and the measured interface time is within a predefined threshold, wherein the acoustic attributes include one or more of: instantaneous acoustic frequency, acoustic amplitude, including waveform amplitude or instantaneous amplitude, or instantaneous acoustic phase, further comprising generating one or more of: a first derivative of the acoustic attribute, a second derivative of the acoustic attribute, an integral of the absolute value of the acoustic attribute, or an integral of the absolute value of a derivative of the acoustic attribute, and wherein the modeled interface time is derived using an assumed acoustic velocity for the material, further comprising assuming a new acoustic velocity for the material if the absolute difference between the modeled interface time and the measured interface time is outside the predefined threshold, and defining at least one material of the subterranean formation.

6. The method of claim 5, wherein the modeled interface time is derived using an assumed density for the material, further comprising assuming a new density for the material if the new acoustic velocity is outside a predefined minimum and maximum velocity.

7. The method of claim 6, further comprising deriving a new measured interface time if the new density is outside a predefined minimum and maximum density.

8. A computer-readable medium storing computer-readable instructions for characterizing material in a wellbore in a subterranean formation, the wellbore having a tubing and multiple casing strings, the computer-readable instructions causing a computing system to:
receive acoustic data representing recorded acoustic waves returning from the subterranean formation;
extract one or more acoustic attributes, including instantaneous acoustic attributes, from the acoustic data representing the recorded acoustic waves;
compare a measured interface time derived from the acoustic attributes with a modeled interface time derived from wellbore completion data for a material between the tubing and a casing string, between adjacent casing strings, or between a casing string and the subterranean formation; and
set the modeled interface time as the interface time for the material if an absolute difference between the modeled interface time and the measured interface time is within a predefined threshold, wherein the acoustic attributes include one or more of: instantaneous acoustic frequency, acoustic amplitude, including waveform amplitude or instantaneous amplitude, or instantaneous acoustic phase,
wherein the computer-readable instructions further cause the computing system to generate one or more of: a first derivative of the acoustic attribute, a second derivative of the acoustic attribute, an integral of the absolute value of the acoustic attribute, or an integral of the absolute value of a derivative of the acoustic attribute and wherein the modeled interface time is derived using an assumed acoustic velocity for the material, the computer-readable instructions further cause and the computing system to assume a new acoustic velocity for the material if the absolute difference between the modeled interface time and the measured interface time is outside the predefined threshold; and
wherein the wellbore includes at least a first casing string, and second casing string, and a material different from a material of at least one of the casing strings between the first casing string and the second casing string, wherein the material is cement.

9. The computer-readable medium of claim 8, wherein the modeled interface time is derived using an assumed density for the material, the computer-readable instructions further causing the computing system to assume a new density for the material if the new acoustic velocity is outside a predefined minimum and maximum velocity.

10. The computer-readable medium of claim 9, wherein the computer-readable instructions further cause the computing system to derive a new measured interface time if the new density is outside a predefined minimum and maximum density.

* * * * *